(12) United States Patent
Genta

(10) Patent No.: US 8,682,600 B2
(45) Date of Patent: Mar. 25, 2014

(54) PIPELINE LEAK DETECTION AND LOCATION SYSTEM THROUGH PRESSURE AND CATHODIC PROTECTION SOIL

(75) Inventor: Pablo Daniel Genta, Saudi Aramco (SA)

(73) Assignee: Saudi Arabian Oil Company, Dhahran (SA)

( * ) Notice: Subject to any disclaimer, the term of this patent is extended or adjusted under 35 U.S.C. 154(b) by 308 days.

(21) Appl. No.: 13/135,516

(22) Filed: Jul. 6, 2011

(65) Prior Publication Data

US 2013/0013228 A1  Jan. 10, 2013

(51) Int. Cl.
| | | |
|---|---|---|
| *G06F 19/00* | (2011.01) | |
| *G01M 3/18* | (2006.01) | |
| *B67D 7/22* | (2010.01) | |
| *B67D 7/32* | (2010.01) | |
| *G01M 3/16* | (2006.01) | |
| *G01F 23/26* | (2006.01) | |

(52) U.S. Cl.
CPC . *G01M 3/18* (2013.01); *B67D 7/22* (2013.01); *B67D 7/3209* (2013.01); *G01M 3/165* (2013.01); *G01F 23/265* (2013.01)
USPC ............ 702/51; 73/40.5 R; 340/432; 340/635

(58) Field of Classification Search
CPC ... G01F 23/265; G01F 23/266; G01F 23/268; G01M 3/16; G01M 3/18; G01M 3/165; G01M 3/186; G01M 3/2807; G01M 3/2815; G01M 3/2892; G01N 27/221; B06D 7/22; B06D 7/3209
USPC ............... 702/45, 47, 51, 55, 63, 98, 99, 100, 702/185, 188; 73/40.5 R; 137/312; 324/693; 340/432, 605
See application file for complete search history.

(56) References Cited

U.S. PATENT DOCUMENTS

| | | | |
|---|---|---|---|
| 3,962,905 | A | 6/1976 | Jouve |
| 4,166,244 | A | 8/1979 | Woods et al. |

(Continued)

FOREIGN PATENT DOCUMENTS

| | | |
|---|---|---|
| DE | 198 41 317 C1 | 2/2000 |
| EP | 0 315 356 A2 | 10/1989 |

(Continued)

OTHER PUBLICATIONS

The International Search Report and the Written Opinion of the ISA for corresponding PCT application No. PCT/US2012/043492 mailed Oct. 5, 2012.

*Primary Examiner* — John H Le
(74) *Attorney, Agent, or Firm* — Abelman, Frayne & Schwab

(57) ABSTRACT

A fuel leakage detection system for an underground fuel piping system having fuel service pits installed at locations along the piping. Each pit has a pressure sensor and a reference electrode positioned external to the pit assembly for continuous and automatic monitoring of fuel pressure and pipe-to-soil potential measurements of an impressed current cathodic protection (ICCP), and each pit assembly includes a processor and a transceiver. The system provides simultaneous and synchronized pressure and ICCP potential measurements which are transmitted over a wireless network to a control station that performs accurate location of a leakage point in the underground piping and can detect pressure loss during fueling operations which produce strong pressure transients that normally mask detection of pressure loss in the fuel piping, and can determine a leak in the piping and its location by analyzing the pipe-to-soil potentials taken on the fuel piping and pressure losses occurring between transients.

23 Claims, 7 Drawing Sheets

(56) References Cited

U.S. PATENT DOCUMENTS

| | | | |
|---|---|---|---|
| 4,280,356 A * | 7/1981 | Stewart | 73/40.5 R |
| 4,608,857 A | 9/1986 | Mertens et al. | |
| 5,072,209 A * | 12/1991 | Hori et al. | 340/432 |
| 5,202,667 A | 4/1993 | Alvin | |
| 5,261,268 A | 11/1993 | Namba | |
| 5,363,093 A | 11/1994 | Williams et al. | |
| 5,708,195 A | 1/1998 | Kurisu et al. | |
| 7,613,584 B2 | 11/2009 | Hoehner et al. | |
| 2003/0074162 A1 | 4/2003 | Fourie et al. | |
| 2006/0124171 A1 | 6/2006 | Ghazarian et al. | |
| 2010/0045471 A1 | 2/2010 | Meyers | |
| 2010/0288019 A1 | 11/2010 | Simmons | |

FOREIGN PATENT DOCUMENTS

| | | |
|---|---|---|
| WO | WO 2004/022456 A2 | 3/2004 |
| WO | WO 2004/025421 A1 | 3/2004 |
| WO | WO 2006/065704 A1 | 6/2006 |
| WO | WO 2009/025666 A1 | 2/2009 |
| WO | WO 2010/028631 A1 | 3/2010 |

* cited by examiner

Apron Hydrant Pit Assembly

PIPELINE LEAK DETECTION AND LOCATION SYSTEM THROUGH PRESSURE AND CATHODIC PROTECTION SOIL

FIELD OF THE INVENTION

The present invention relates to the detection and location of fuel leakages occurring in underground jet fuel piping systems of the type employed in civil airports and military air bases, and more specifically to providing continuous monitoring for leaks and pressure losses in fuel pipelines, as well as providing status and the control of jet fuel supply valves, isolation valves, jet fuel pumps and other instrumentation in jet fuel piping systems.

BACKGROUND OF THE INVENTION

The jet fuel supply system of high-traffic commercial civil airports generally comprises an underground fuel distribution piping system that transports fuel to the fuel valves which are distributed around the airport terminals for facilitating fueling of the arriving and departing aircraft in a timely manner. At high-traffic airports, the aircraft fueling operation may also be performed through mobile dispensers (e.g., fuel trucks) that bring the fuel to the aircraft and pump it at the required aircraft inlet pressure, provide additional fuel filtration, as well as provide flow measurements for ticketing and accounting purposes.

In these types of high traffic airports, the underground jet fuel piping system is equipped with underground jet fuel valves which are installed inside underground valve pits that are often positioned near the terminal gates where the aircraft undergo fueling operations. Additionally, valve vents are provided to degas the piping during piping system start-up and for overpressure control purposes. The valve vents are installed in vent pits which are dispersed at predetermined locations along the main pipeline including proximate to the terminal gates.

Referring to FIG. 1, a prior art jet fuel hydrant pit assembly 100 is illustratively shown. The pit assembly 100 is formed below ground level in the apron 102 and can be prefabricated with fiberglass or steel walls 104 that is cylindrical or rectangular in shape. The pit assembly 100 includes a protective cover 106 that is rotatably or pivotally hinged for access, and in the closed position is substantially flush with the apron 102 for protection and safety purposes. The cover is opened to provide access to the jet fuel valves during refueling and maintenance operations. The pit assembly 100 is positioned in the vicinity of the main fuel pipeline 108 and a lateral connecting pipe 110 is attached at one end to the fuel main 108 and with the opposite end extending into the pit assembly 100. A manual maintenance valve 112 is mounted on the discharge end of the lateral connecting pipe to shut off the flow of jet fuel therethrough. A hydrant valve 114 is mounted via a pipe fitting over the maintenance valve and is configured to receive a fluid-tight end fitting from a fueling hose (not shown). During operation, the jet fuel is pumped from a central pump station through the main fuel pipeline, the lateral pipe connection, the hydrant valve, and into a fueling hose releasably coupled to the hydrant valve to fill the fuel tanks of an aircraft or mobile fuel dispenser.

The jet fuel system further includes surge absorbers to avoid overpressure peaks that may occur during aircraft fueling. The system pressure is maintained by a pressurization control system that includes one or more pressure sensors (normally located near the main fuel pump facility), and a series of jockey pumps and circulation pumps that maintain the fuel pressure during fueling operations. Fuel leaks in the underground fuel systems can be caused by external corrosion to the piping which can develop gradually over time, as well as poor weld or gasket seals between the piping, fittings, and the like. The presence of hydraulic noise and surges generated by frequent aircraft refueling and the combined actions of the pressure recovery jockey pumps and the circulation pumps, which maintain the necessary jet fuel pressure during fueling operations, often makes it difficult to detect and locate existing underground leaks in real time. In the event an underground leak occurs, the continued operation of the jockey and circulation pumps often masks pressure losses created by the fuel leak.

There are numerous airports that have jet fuel pipeline systems which are not equipped with instrumentation for taking continuous pressure measurements at specific tapping or test points along the underground piping system. Installing additional pressure tapping (i.e., test) points and the associated electrical conduits for providing power to the instrumentation is often prohibitively expensive, due to high construction costs for demolishing and then replacing the thick concrete flooring structures (e.g., the aprons) that surround the terminals, taxiways and tug roads.

Accordingly, current pressure detection practices in the jet fuel line under the airport apron require taking the measurements manually at a few specific locations by first turning off the jockey and circulation pumps and then conducting a visual inspection of the vent and jet fuel valve pits. Namely, prior art pipeline leakage detection systems typically employ leakage detection tests, such as hydrostatic testing and depressurization monitoring, which are conducted manually. These manual detection techniques subsequently require subjective decisions to be made from data measurements that are collected at different times, and which must then be analyzed without having the benefit of sufficient data synchronization.

Similarly, there is no measurement mechanism for continuous measurement and retransmission of jet fuel pipe-to-soil potentials from vent-valve pits installed remotely around airport aprons to a central processing station. Accordingly, the prior art pipeline leak detection systems lack sufficient capabilities to simultaneously record and verify the pressure variations due to underground leakage with the corresponding changes in pipe-to-soil potential.

Moreover, there is no wireless communication system, such as a solar-powered wireless communication system available for jet fuel pipes installed (i.e., buried) beneath an airport apron that can collect, time stamp and retransmit continuous real-time measurements of both pipe-to-soil potential and pressure to a central control station for further processing. Accordingly, the detection and location of underground leaks is accomplished by methods that do not have real-time synchronization of measurements. Consequently the prior art systems lack of the necessary means to recognize actual leakages already manifested in the soil from pressure transients that are present in daily operations of airport jet-fuel lines.

In addition to jet fuel pipeline pressure monitoring, jet fuel piping systems are also generally protected by impressed current cathodic protection (ICCP) systems, which utilize a transformer and DC (direct current) rectifier that applies an electrical current to the piping structure to protect it from external corrosion. The impressed current cathodic protection systems typically include pipe-to-soil potential measurement points which are used to monitor the effectiveness of the cathodic protection. However, similar to the lack of pressure instrumentation for continuously monitoring pressure leaks at specific locations, there is no instrumentation available at specific locations (e.g., valve and vent pit assemblies) along the jet fuel piping system that enables continuous monitoring of pipe-to-soil potential measurements.

SUMMARY OF THE INVENTION

The disadvantages heretofore associated with the prior art are overcome by the present invention which comprehends an apparatus and method to continuously monitor jet fuel line pressure, and detect leaks using pipe-to-soil potential measurements of an impressed current cathodic protection (ICCP) in conjunction with fuel pressure measurements. The present invention, collectively referred to as "system", includes various electronic instrumentation devices and sensors to safely measure jet fuel piping pressure inside underground fuel vent pits and fuel valve pit assemblies in which explosive atmospheres created by jet fuel vapors can be present. Power for the instrumentation and communication devices installed in each fuel vent pit and valve pit is provided by a local rechargeable battery which is recharged by electrical power from an array of solar cells located in the exterior of the cover of the pit assembly.

The present invention provides various methods to detect and locate pressure loss of jet fuel piping during aircraft fueling operations, and to transmit the measured signals over a wireless network, thereby ensuring low power consumption and durability of the power source. The system measures the jet fuel piping pressure and the ICCP pipe-to-soil potential, processes both measurements by a local signal processor, and transmits the measurements over the wireless network to a control station. The system is capable of detecting pressure losses occurring during aircraft jet fueling operations which produce strong pressure transients that normally make it difficult to detect pressure losses in the jet fuel piping. The system determines the existence of an underground leak in the jet fuel piping by measuring and further analyzing the electrochemical pipe-to-soil potentials taken on the jet fuel piping and by analyzing pressure losses between transients. The pipe-to-soil potential is measured against a reference electrode, and the local processor processes the pressure and ICCP potential measurements contemporaneously in a synchronized manner, and the processed information is transmitted to a control station which determines the location of a leak in the underground jet fuel piping system.

In one embodiment, the present invention includes an apparatus for detecting fuel leaks at a fuel depot having at least one fuel service pit assembly for managing fuel flow from an underground fuel pipeline, the at least one fuel service pit assembly including at least one sidewall having an inlet for receiving a connecting pipeline in fluid communication with the underground fuel pipeline, and a pit cover for accessing the at least one service pit assembly. The leak detection apparatus comprises a reference electrode respectively buried underground proximate each of the at least one fuel service pit assemblies; the at least one fuel service pit assembly further comprising: a local signal processor coupled to memory for communicating and storing present and previous pipe-to-soil potential measurements during fueling and non-fueling operations, the signal processor configured to receive a first electrical signal indicative of an electrical potential from the reference electrode and a second electrical signal indicative of an electrical potential at a local section of the pipeline, the signal processor operable to preprocess the pipe-to-soil measurements by receiving sample pipeline and soil electrical potential measurements at predetermined intervals, calculating an average pipe-to-soil potential value based on the sample pipeline and soil potential measurement values, and comparing the latest sample pipe-to-soil potential measurement with the average pipe-to-soil potential value; a local transceiver communicably coupled to the local signal processor for receiving the preprocessed pipe-to-soil measurements from the signal processor; and a central control station having a central transceiver for receiving the preprocessed pipe-to-soil measurements from the local transceiver over a communications network, and a central processor for further processing the preprocessed pipe-to-soil measurements received from the at least one fuel service pit assembly to detect and locate the position of a fuel leak in the underground fuel pipeline.

In one aspect, the pit cover comprises a watertight and heat-resistant housing mounted to its underside and configured to enclose the local signal processor and the local transceiver.

In another aspect, the first and second electrical potential signals are provided through first and second electrical conductors which are enclosed in a flexible conduit having a length sufficient to permit the opening and closing of the pit cover.

In one embodiment, the fuel service pit assembly is a vent pit assembly. Alternatively, the fuel service pit assembly can be a valve pit assembly.

In one aspect the apparatus further comprises a switch having an actuator coupled to the pit cover that permits power flow to the local signal processor and local transmitter when the pit cover is closed, and disables power flow to the local signal processor and local transmitter when the pit cover is opened.

In yet another aspect, the at least one fuel service pit assembly comprises a plurality of service pit assemblies, and the central control station further comprises a memory coupled to the central processor; and a pipeline leakage detection program stored in the memory and executable by the central processor, the pipeline leakage detection program operable to: receive preprocessed pipe-to-soil potential measurements from adjacent service pit assemblies transmitted over the communications network from each of the plurality of service pit assemblies at predetermined intervals; determine whether the pipe-to-soil measurements at adjacent service pit assemblies have changed proportionally; and if it is determined that the pipe-to-soil potential measurements deviate from patterns associated with non-leakage conditions, the pipeline leakage detection program is further operable to: provide an alert condition to operating personal indicative of a pipeline leak; determine the location of the pipeline leak based on a distance between the present pipe-to-soil potential and the previous pipe-to-soil potential patterns at each service pit assembly location; and determine appropriate low pressure alarm set points for fuel pumps that control fuel flow through the underground pipeline.

In still another aspect, the location of the leak is determined by comparing present pipe-to-soil potential and the previous pipe-to-soil potential patterns at each service pit assembly location. In another aspect, the apparatus further comprises a wireless antenna mounted within a cavity formed in the pit cover, wherein the wireless antenna is communicably coupled to the local transceiver for receiving and transmitting information wirelessly over the wireless network.

In one embodiment, the at least one fuel service pit further comprises a pressure sensor mounted within the housing; a vent valve coupled to the underground pipeline via the connecting pipeline; and a capillary tube coupled between the pressure sensor and the underground pipeline, wherein the capillary tube is flexible and extends a length sufficient to permit personnel access to the service pit assembly through the pit cover. In one aspect, the vent valve can be coupled to the underground pipeline by a vent pipe connection having a distal end mounted to the pipeline, a maintenance valve mounted to the opposing proximal end of the vent pipe connection, and a T-fitting mounted between the maintenance valve and the vent valve, and wherein the capillary tube has a first end mounted to the T-fitting and the opposing second end communicably coupled to the pressure sensor.

In one aspect, the local signal processor receives pressure measurements from the pressure sensor at predetermined intervals and performs pattern recognition routines to determine the occurrence of fueling operations and non-fueling operation. In another aspect, the local signal processor is operable to compare current pressure measurements with previous pressure patterns obtained during fueling operations.

In one embodiment, the pit cover includes a power supply assembly comprising at least one solar cell mounted in a compartment formed within the outer surface of the pit cover, a battery charger electrically coupled to receive electrical current from the at least one solar cell, a rechargeable battery electrically coupled to the battery charger, and a switching control circuit for controlling power to the local signal processor and the transceiver. In one aspect, the pit cover further comprises a wireless antenna mounted under a protective high-compression resistant non-metallic cover formed on the top surface of the pit cover, the antenna being electrically coupled to the transceiver via a cable.

In one aspect, the local signal processor is operable to perform signal conditioning and noise filtering in order to reduce the level of noise produced by fueling operation and fuel surges. In another aspect, the apparatus of claim 1, wherein the local signal processor is operable to detect negative pressure peaks caused by leaks and impressed current cathodic protection pipe-to-soil potential loss determination.

In one embodiment, the central processor is operable to: receive, from each local signal processor installed at each fuel service pit, the pre-processed signals associated with local pressure measurements; and perform pattern recognition to detect pressure losses in the pipeline. In another aspect, the central processor is operable to: receive, from each local signal processor installed at each of the at least one fuel service pit assembly, the preprocessed pipe-to-soil measurements; and calculate differences of electrical potential loss measured at adjacent fuel service pits. In yet another aspect, the central processor is operable to: monitor pressure loss rate at each local service pit assembly; and adjust pressure level alarms based on aircraft fueling operations.

In one embodiment, the central processor is operable to: determine drops in electrochemical potential along the underground fuel pipeline from adjacent service pits; compare the drops in electrochemical potential to historical electrochemical potentials at each service pit; and identify a leakage condition between adjacent service pits when the comparative drops in electrical potential exceed a predetermined value. In another embodiment, the at least one fuel service pit assembly further comprises a cover switch having an actuator that interrupts power flow to the local signal processor and local transceiver when the pit cover is in an open condition.

In one aspect, the communications network comprises a wireless communications network. Alternatively, the communications network includes a wired communications network.

In still another embodiment, a method for detecting fuel leaks at a fuel depot having at least one fuel service pit assembly for managing fuel flow from an underground fuel pipeline is provided. The at least one fuel service pit assembly including at least one sidewall having an inlet for receiving a connecting pipeline in fluid communication with the underground fuel pipeline, a pit cover for accessing the at least one service pit assembly, the pit cover including a local signal processor coupled to memory for communicating and storing present and previous pipe-to-soil potential measurements during fueling and non-fueling operations, the local signal processor being communicably coupled to a local transceiver for communicating pressure and electrical potential measurements to a central control station over a communications network, and a reference electrode respectively buried underground proximate each of the at least one fuel service pit assemblies, the leak detection method comprises the steps of: receiving, at the local signal processor, a first electrical signal indicative of an electrical potential from the reference electrode and a second electrical signal indicative of an electrical potential at a local section of the pipeline; preprocessing pipe-to-soil measurements by receiving sample pipeline and soil electrical potential measurements at predetermined intervals, calculating an average pipe-to-soil potential value based on the sample pipeline and soil potential measurement values, and comparing the latest sample pipe-to-soil potential measurement with the average pipe-to-soil potential value; communicating the preprocessed pipe-to-soil measurements from the signal processor to the local transceiver; transmitting the preprocessed pipe-to-soil measurements to the central control station over the communications network; and processing, at the central control station, the preprocessed pipe-to-soil measurements received from the at least one fuel service pit assembly to detect and locate the position of a fuel leak in the underground fuel pipeline.

BRIEF DESCRIPTION OF THE DRAWINGS

Further advantages and features of the present invention will become apparent from the detailed description of a preferred embodiment of the invention with reference to the accompanying drawings, in which.

Figure 1:
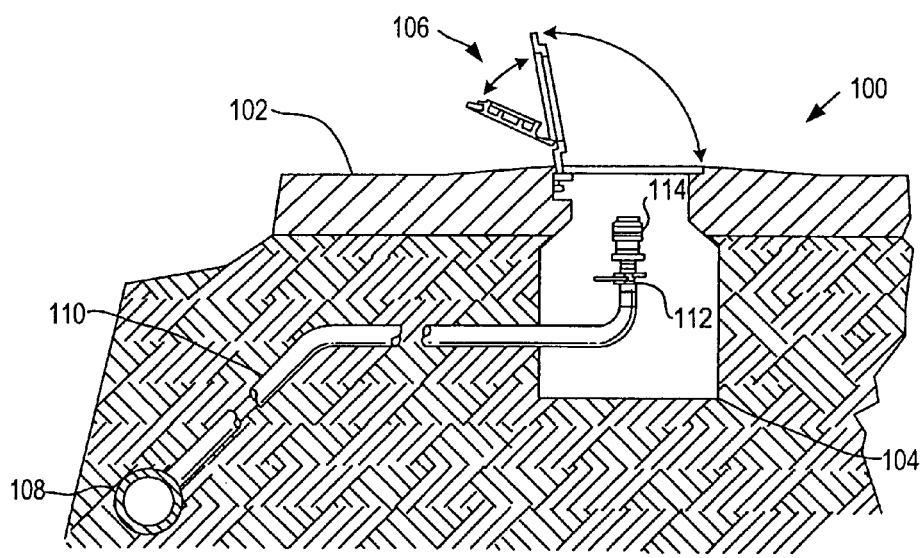
FIG. 1 is a cross-sectional view of a jet fuel pipeline coupled to a prior art apron hydrant pit assembly illustratively located at an airport.

To facilitate an understanding of the invention, identical reference numerals have been used, when appropriate, to designate the same or similar elements that are common to the figures. Unless stated otherwise, the features shown in the figures are not drawn to scale, but are shown for illustrative purposes only.

DETAILED DESCRIPTION OF THE PREFERRED EMBODIMENTS

The present invention comprehends an improved system and method for monitoring and detecting fuel leakages that may occur in underground fuel pipeline systems. Although the underground fuel pipelines are primarily described in terms of pipelines used for providing jet fuel to aircraft at an airport, a person of ordinary skill in the art will appreciate that the present invention can also be implemented along pipeline systems that transport other types of fuels (e.g., oil, gasoline, ethanol) or liquids (e.g., water), as well as at other types of facilities, such as refineries, fuel depots and railroads, among other facilities.

The present invention employs a monitoring system and methods associated therewith using one or more sensing devices to automatically and continuously monitor for underground pipeline fuel leaks. The present invention monitors pipeline fuel pressures and electrochemical pipe-to-soil potentials at one or more fuel service pit assemblies, such as vent pit assemblies and/or valve pit assemblies, by measuring changes in fuel pressure and pipe-to-soil potentials that may occur during fueling and non-fueling operations. The measured values are initially sampled, filtered and generally "processed" locally by a signal processor installed at each service pit assembly, and the processed data is forwarded to a centralized control station for further analysis to accurately detect and locate underground pipeline leakages.

In one embodiment, the present invention includes monitoring pipe-to-soil potential measurements, which are taken from impressed current cathodic protection (ICCP) provided along the pipeline, to determine the location of any fuel leaks in the piping. Although the present invention is described with regard to fuel vent pits located at airports, such structure and location is not considered as being limited, as the present invention is also suitable for implementation inside underground fuel valve pits, among other underground fuel service structures in which access to underground fuel pipelines is provided.

In one embodiment, the instrumentation installed in the vent pits includes a pressure sensor, a signal processor, a wireless transmitter, a rechargeable battery and a solar cell array that is used to recharge the battery which provides power to the electronic instrumentation. The monitoring and processing devices installed locally in the vent pits take continuous measurements of the jet fuel piping pressure and the ICCP pipe-to-soil potential. The signal processor takes measurement readings (i.e., samples) at predetermined intervals and further processes the sample measurements for transmission over a wireless network to a remotely located central control station for further processing and analysis.

The pipe-to-soil potential is measured between the pipeline and a reference electrode buried proximate the pipeline. Significant changes in the pipe-to-soil potential from previously observed normal readings are indicators of a fuel leak. Additionally, significant changes from previously observed normal pipeline fuel pressure patterns occurring during fueling operations and non-fueling operations are also indicators of a fuel leak. In this manner, the system is capable of detecting pressure losses during aircraft fueling operations, which produce strong pressure transients that normally make it difficult to detect pressure losses in jet fuel piping. The system provides contemporaneous and synchronized pressure and ICCP potential measurements that are transmitted from the service pit assemblies to the control station. Upon receiving the pre-processed data from the service pit assemblies, the control station, which includes a central processor and associated programs, further processes the data to accurately determine the existence and location of a leak in the underground jet fuel pipeline system.

Figure 2:
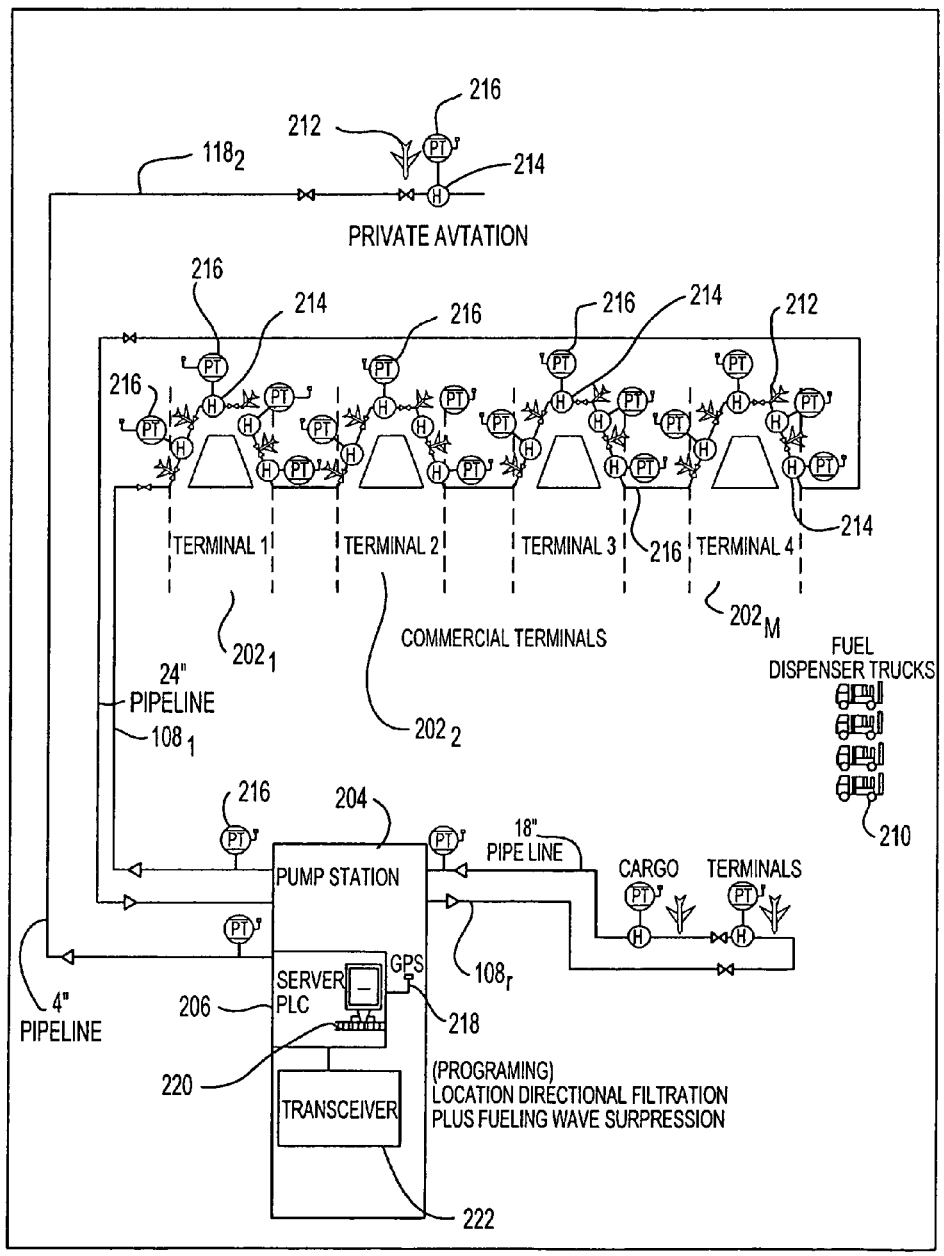
FIG. 2 is a top schematic view of an illustrative airport implementing a jet-fuel pipe leakage detection system in accordance with the present invention.

Referring now to FIG. 2, an illustrative airport implementing a jet fuel pipe leak-detection system 200 in accordance with the present invention is shown. Examples of typical jet fuel piping arrangements in airport terminals are provided in the NFPA 407 Standard, the content of which is incorporated herein by reference.

The leak-detection system 200 includes at least one underground fuel pipeline 108 (e.g., pipelines $108_1$ through $108_r$), which extends between a pump house/station 204 and one or more terminals 202, such as terminals $202_1$ through $202_m$ (where "m" and "r" are integers greater than one). A plurality of jet fuel valve pits 214 (e.g., hydrant valve pits labeled "H" in FIG. 2) and a plurality of pressure vent pits 216 (e.g., vent pits optionally having pressure transmitters labeled "PT" in FIG. 2) are dispersed along the pipelines 108 at predetermined locations to provide jet fuel to the aircraft and/or fuel dispenser trucks 112. The valve pits 214 and vent pits 216 include instrumentation for detecting pipeline pressure and the pipe-to-soil potential as described in further detail with respect to FIGS. 3-7.

One or more pumps (not shown) at the jet fuel pump station(s) 204 pump the jet fuel through the one or more main pipelines 108, which are routed along the terminals 202, hangers or other fueling locations at the airport. The jet fuel pressure is maintained within a predetermined range to satisfy flow rate demands during fueling operations. Preferably, the system 200 includes a centralized control station 206 having a transceiver 222 for receiving information from and sending information to the vent pits 214 and valve pits 216. The centralized control station 206 further includes one or more computing devices 220 for processing pipeline pressure measurements, pipeline-to-soil potential measurements and the like, which are received from the local instrumentation of the present invention installed in the valve and vent pits. In one embodiment, the computer device 220 at the central control station 206 compares the measured values with previously known values that occur under normal operating conditions during fueling and non-fueling operations. In the event that there are deviations that exceed a predetermined value or level, alarm conditions can be initiated so that corrective action can be taken by the field personnel.

For example, if the pipeline pressure drops at one or more vent pits (i.e., test points), the computer device 220 at the central control station 206 can execute predetermined program routines to determine if a fuel leakage condition exits and, if so, its location. Although the central control station 206 is illustratively shown as being located at the pump station 204, such choice of location should not be considered as limiting. Alternatively, a plurality of remote control stations 206 can be implemented at various locations at the airport. For example, a remotely located control station can be positioned in the vicinity of a single or multiple valve/vent pits, among other locations at an airport.

Figure 3:
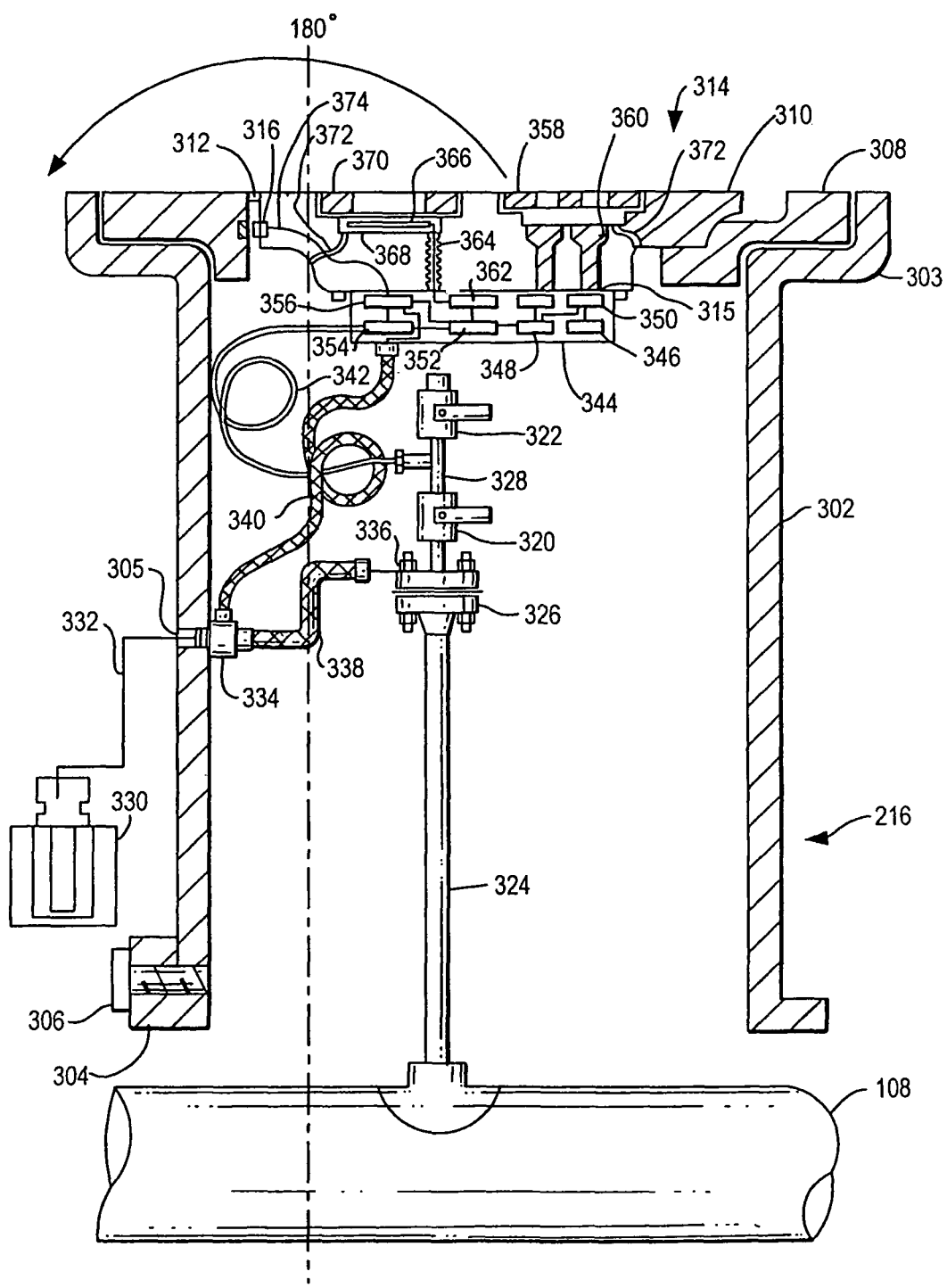
FIG. 3 is a partial cross-sectional view of a fuel vent pit assembly fitted with a pit cover in accordance with the present invention.

Referring now to FIG. 3, a partial cross-sectional view of a typical pressure vent pit assembly 216 of the present invention is illustratively shown. The pit assemblies are an integral part of the overall safety of airport fueling systems. For example, pressure vent pits 216 are installed at designated areas along the pipeline to relieve air pockets that can accumulate at fuel pipeline high points. This helps prevent air-induced surges and erratic action of control and hydrant valves.

The vent pit assembly 216 is positioned over or adjacent to the buried fuel pipeline 108 and includes at least one sidewall 302 and a cover 308. The sidewall 302 can be fabricated from a well-known material or alloy, such as fiberglass or steel or concrete, among other suitable materials. An illustrative commercially available pressure vent pit suitable for use in the present system is a 1463-FM model fiberglass service pit high point vent, which is manufactured by GNY Equipment Inc. of Bay Shore, N.Y., USA, among other similar types and manufacturers of vent pits.

The vent pit assemblies 216 are installed in the concrete slab and ground forming the apron surrounding the terminals or hangers at the airport. Preferably, the top portion of the sidewall 302 is substantially flush or level with the upper surface of the apron. The vent pit 216 can be substantially cylindrical or rectangular in shape, and includes an outwardly extending flange 303 formed at the upper end of the sidewall 302. Preferably a drain 304 with a removable drain plug 306 is provided at the lower end of the vent pit for quickly removing any excess fuel or water that may accumulate in the vent pit 216.

A cover ring 308 is seated or otherwise mounted within the internal walls of the flange 303 to support the pit cover 310. Preferably, the pit cover 310 is pivotally attached to one side of the cover ring 308 by a hinge 312. An opposing free end of the pit cover 310 extends over and is supported by the cover ring 308. A lip is preferably provided along the edge of the pit cover 310 to permit the fingers of a field technician to lift and rotate the free end of the pit cover 310 about the hinge to open and access the vent pit assembly 216. In one embodiment, the upper surface 314 of the pit cover is substantially planar, and the cover can be rotated 180 degrees about the hinge 312. A person skilled in the art will appreciate that other fasteners can be used to permit a user to easily open and close the pit cover 310.

The vent pit assembly 216 provides access to a manual vent valve 322, which is opened as required to degas the piping during piping system start-up and for overpressure control purposes. In particular, an interconnecting vent pipe 324 has a lower end attached to a flange or T-fitting of the main pipeline 108 and extends upwards through the bottom of vent pit 216. A root valve 320 is mounted to a flange 326 formed at the upper end of the interconnecting vent pipe 324. The vent valve 322 is serially mounted over the vent root valve 320 through an interconnecting T-shaped pipe fitting 328. Specifically, one end of the T-fitting 328 is mounted to the vent valve 322 and an opposing end is mounted to the vent root valve 320. The vent root valve 320 can be used to vent single line pressure to atmosphere before removal of an instrument in the vent pit, or to assist in calibration of control devices. Accordingly, small quantities of air or other non-toxic gases that exceed a predetermined pressure can escape from the main fuel pipeline 108 by flowing through the interconnecting pipe 324, the vent root valve 320, the interconnecting T-fitting 328, and finally through the vent valve 322.

The vent pit assembly 216 includes a pressure sensor 354 that measures the fuel pressure in the interconnecting pipe 324. The pressure sensor 354 is mounted to the underside of the pit cover 310, as described below in further detail. As shown in FIG. 3, gas pressure measurements are taken by the pressure sensor 354 through a capillary tube 342, which has one end that is connected to the remaining port of the interconnecting tee 328 and an opposing end that is coupled to the pressure sensor 354. The capillary tubing 342 is fabricated from a flexible, fire resistant material, such as nylon with polyester braid, fluoro-polymers suitable for pressures of 1200 psig, and the like, and extends a length that is sufficient to enable the pit cover 310 to be opened and closed without interference. The use of the capillary tubing 342 reduces the likelihood of the jet fuel spillage or leakage contacting electrical components in the pit, thereby reducing the undesirable risks of jet fuel ignition.

Figure 6:
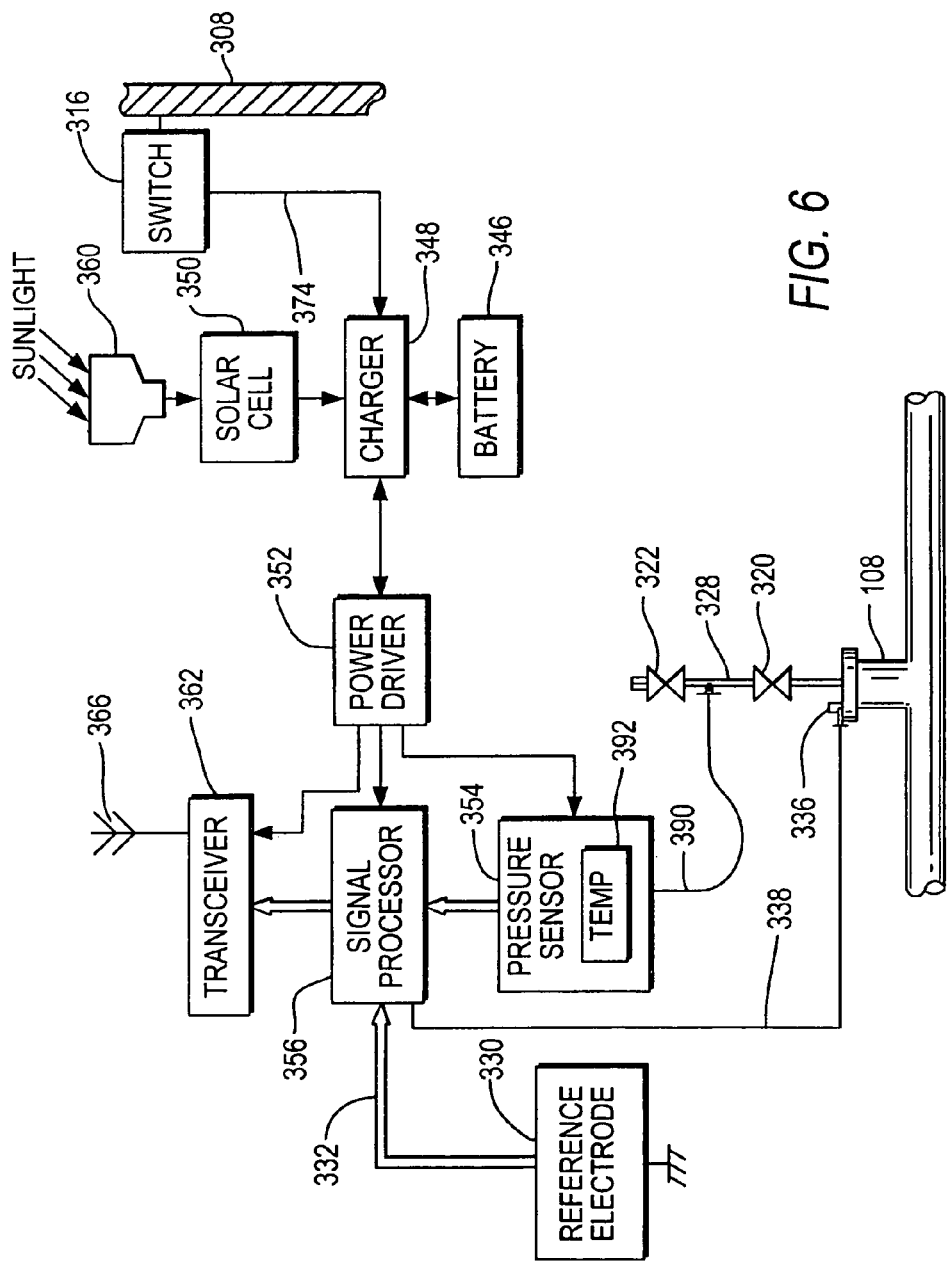
FIG. 6 is a schematic block diagram illustrating electrical connectivity of the jet fuel pipe detection system in accordance with the present invention.

Referring to FIG. 6, in an alternative embodiment the pressure sensor 354 further includes a temperature sensor 392, wherein a pressure transducer and temperature sensor are both housed within a single enclosure (i.e., housing). An illustrative pressure/temperature sensor suitable for use in the present invention is a PPTR Precision Pressure Transducer—Ruggedized manufactured by Honeywell International, located in Plymouth, Minn., USA. The pressure sensor 354 can be coupled to the interconnecting T-fitting 328 with process impulse tubing 390 instead of using the capillary tubing 340 as shown in FIG. 3. The use of conventional impulse tubing lines 390 instead of capillary tubing 340 enables both pressure and temperature measurements to be taken by the transducer 354, as well as reducing possible damping effects of the pressure signal that may be caused by the capillary tubing.

Referring to FIG. 3, the pit cover 310 includes a lower surface 315 that is substantially planar. Mounted to the lower surface 315 of the pit cover 310 is an enclosure 344 that houses the instrumentation of the present invention. The enclosure 344 is preferably fabricated from hardened steel or other explosion proof metal or composite and is fastened (e.g., bolted) 384 to the lower surface 315 of the pit cover 310. In one embodiment, the enclosure 344 facilitates housing of the pressure sensor 354, a signal processor 356, a wireless communications device 362, a power driver 352, a rechargeable battery 346, a battery charger 348, and at least one solar cell 350.

Figure 5:
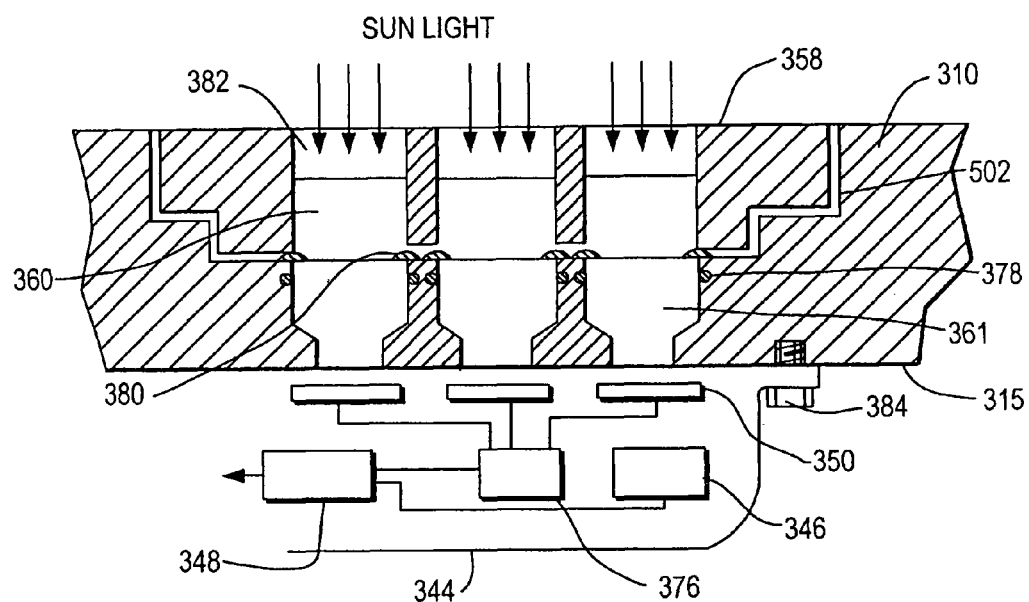
FIG. 5 is a partial cross-sectional view of the fuel vent pit cover along lines 5-5 of FIG. 4 and illustrating a solar collector assembly for providing power to electronic components in the fuel vent pit assembly via a rechargeable battery.

The pressure sensor and the other electronic instrumentation that is installed in the vent pit 216 are powered by a rechargeable battery 346. The battery 346 can be a single 7.5 VDC battery or include a plurality of batteries (i.e., serially coupled batteries) forming a battery pack which is/are operable at temperatures of 85 degrees C. The battery 346 is rechargeable by the charger 348 when the voltage level drops below a predetermined value. The battery charger 348 monitors the voltage level of the battery pack 346 and provides a steady flow of electric current to the battery pack 346 in a well-known manner. The battery charger 348 receives current flow from one or more photoelectric (solar) cells 350, which convert sunlight to electricity in a well-known manner. As shown in FIG. 3, the pit cover 310 illustratively includes two solar cells 35. Alternatively, FIG. 5 illustratively depicts three solar cells 350 for providing power to the electronic instrumentation installed to the pit cover 310. A person of ordinary skill in the art will appreciate that an array of photoelectric cells 350 can be provided based on the power requirements of the instrumentation in the vent pit 216.

Referring to FIG. 5, the pit cover 310 includes a plurality of fiber optic couplers for collecting and channeling sunlight to illuminate a plurality of solar cells 350. The solar cells 350 provide power to recharge a battery pack 346 via a battery charging device 348.

The pit cover includes a cutout 502 formed in its upper surface 314 which is sized to securely receive a solar collector cover 358. In one embodiment, the solar collector cover is secured in the cutout 502 with a waterproof sealant 380. The solar collector cover 358 can be fabricated from a metallic material, such as aluminum, aluminum alloy 6061-T6, and the like, although such materials should not be considered limiting. The solar collector cover 358 and cutout 502 include a plurality of orifices 382 that extend from the upper surface 314 to the lower surface 315 of the pit cover 310. Each orifice 382 is sized to receive and pass a fiber optic coupler 360 therethrough.

Figure 4:
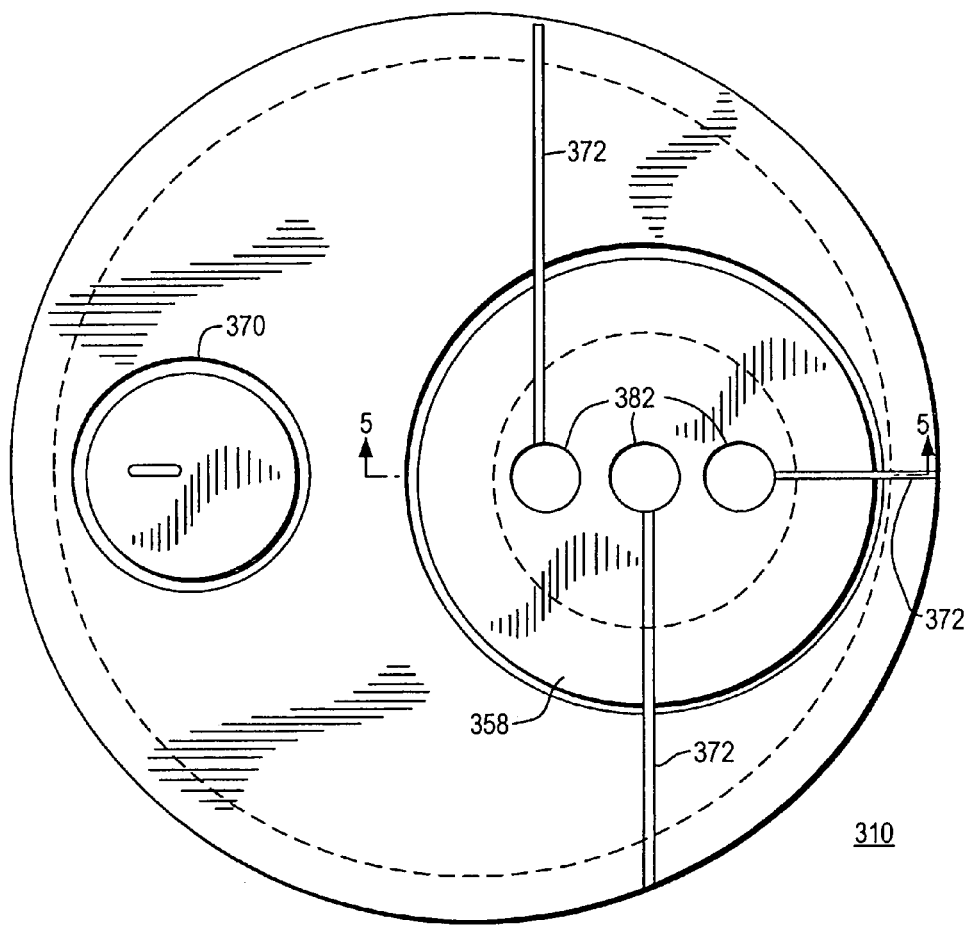
FIG. 4 is a top view of another embodiment of a fuel vent pit cover in accordance with the present invention.

Referring to FIG. 4, the pit cover 310 also includes one or more drain grooves 372 that collect moisture and direct it away towards the outer periphery of the pit cover 310. In particular, a drain groove 372 is provided in each orifice 382 to direct any moisture laterally away therefrom.

Sunlight passes through each orifice 382 and is captured by a corresponding fiber optic coupler 360 which directs the light to an associated solar cell 350. As shown in FIG. 3, a pair of fiber optic couplers 360 is longitudinally aligned with the pair of orifices 382 which extend downward to the lower surface 315 of the pit cover 310 over a respective pair of solar cells 350. In an alternative embodiment shown in FIG. 5, a primary fiber optic coupler 360 is mounted in each orifice of the solar collector cover 358, and a secondary fiber optic coupler 361 is longitudinally aligned with the primary fiber optic coupler 360 and mounted in the lower portion of the pit cover 310 below the cutout 502. Each secondary line of fiber couplers 361 channels the light from the primary fiber couplers 360 and concentrates the light over a corresponding solar cell 350. A person of ordinary skill in the art will appreciate that a tempered glass covering having a high load resistance (not shown) could be placed over the solar cells 350 instead of the fiber optic couplers 360 to enable the solar cells 350 to collect light.

The secondary fiber optic couplers 361 are preferably mounted in the lower portion of the pit cover 310 with O-rings 378 to ensure proper insulation and moisture resistance. Alternatively, a sealant can be used to mount the secondary fiber optic couplers 361 within the pit cover 310. The upper surface of the primary fiber optic coupler 360 is sealed with a suitable high-temperature sealant 380. In either embodiments shown in FIGS. 3 and 5, the light collected by the fiber optic couplers is directed to the solar cells 350, which convert the light to electricity in a well-known manner. In one embodiment, the electrical current produced by the solar cells 350 is directed through a junction box 376, which feeds electrical power to the battery charger 348. The battery charger 348 further provides power to the power driver 352, which is shown in FIG. 6. An illustrative power driver is model MAX 586 DC/DC converter produced by MAXIM Integrated Products, Inc. of Sunnyvale, Calif., although other commercially available power drivers can be provided.

Referring to schematic diagram of FIG. 6, the electrical connections between the electronic instrumentation in the vent pit assembly 216 is illustratively shown. The array of solar cells 350 provides electrical power to the charger 348, which recharges the battery pack 346 when the voltage level is low. The battery pack 346 further provides power to the power driver or amplifier, 352, which in turn provides power to the signal processor 356, pressure sensor 354, and wireless communications device (e.g., transmitter or transceiver) 362. In particular, the power is controlled by a power driver 352 which controls the power levels to the processor 356, sensor 354 and battery charger 348. The power driver 352 receives the power from the battery charger 348, which receives the power from the battery 346 or solar cells 350.

Referring to FIG. 3, the vent pit assembly 216 includes a switching circuit to enable/disable power to the electronic instrumentation. In one embodiment, a switch 316 (e.g., magnetic switch) is provided between the pit cover 310 and the supporting pit cover ring 308. When the pit cover 310 is closed, the switch 316 enables converted electrical power from the solar cells 350 to flow to the battery charger 348, which provides the power to the electrical instrumentation as described above.

When the pit cover 310 is opened, the switch 316 triggers a power disable signal in the battery charger 348. Consequently, power provided to the battery 346 from the solar cells 250, as well as power to the power driver 352 is terminated, which in turn disables power to the signal processor 356, pressure sensor 354 and transmitter 362. In this manner, power to the electrically powered devices installed in the jet fuel vent pit is quickly disabled in order to avoid the exposure of these electrically powered devices to jet fuel during maintenance and inspection.

Referring again to FIG. 3, the method of the present invention includes monitoring pipe-to-soil potential measurements, which is taken from impressed current cathodic protection (ICCP) provided along the pipeline, to determine the location of any fuel leaks in the piping. A reference electrode 330 is inserted in the soil that surrounds the lateral wall 302 of the vent pit 216. A perforation of sufficient diameter is formed in the apron in order to insert the reference electrode 330 into the ground near the pipeline 108 from the surface. Illustratively, the reference electrode 330 can be a copper/copper sulfate reference electrode manufactured by Telemagnetica s.r.l of Milano Italy, although such materials forming the reference electrode should not be considered limiting.

The pipe-to-soil potential is measured between the reference electrode 330 and the pipe metallic structure. Specifically, a wire conductor 332 is routed from the reference electrode 330 through an orifice 305 formed in the wall 302 of the vent pit assembly 216 and is coupled to the signal processor 356, which measures the voltage potential of the soil. Further, a wire conductor is routed from a flange 336 or other accessible interconnection of the interconnecting vent pipe 324 or main pipe 108 to the signal processor 356 to measure the voltage potential of the pipe 108. A person of ordinary skill in the art will appreciate that the voltage potential of either the pipeline or soil can be determined by measuring the actual voltage or converting resistance values to voltage potentials thereof. As shown in FIG. 3, the conductors 332 and 338 are connected to a junction box 334, and routed through a flexible conduit 340 to the signal processor. The flexible conduit 340 is preferably fabricated from a heat resistant/fire retardant material and is of sufficient length to permit the opening and closing of the vent cover 310 during inspection and maintenance. The signal processor 356 compares the actual and/or computed voltages from the soil and pipe to determine the pipe-to-soil potential at the vent pit assembly 216.

In one embodiment, a fuel dispensing truck 210 includes monitoring equipment that is capable of monitoring fuel pipeline pressure at a service pit assembly immediately after fueling has stopped. During operation, the fuel dispensing truck 210 is parked near the fuel valve, and a fuel hose is securely connected (i.e., locked) to the hydrant fuel valve. The fuel flows into the fuel dispenser intake system, passing through the flow meter (rotary type) of the valve. The valve includes a pipe that connects to the flow meter. The pipe also has a fitting from which an optional pressure capillary tube can be connected. Preferably, the capillary tube is used instead of directly tapping the sensor to the pipe, since the sensor typically requires a greater number of connections to take the readings.

As noted above, when the pit cover 310 is opened, the magnetic switch 316 disables power to the pressure sensor 354, signal processor 356 transmitter 362 and antenna 366. The fuel dispensing truck 210 includes a power supply and corresponding power cabling (not shown) which can be used to provide power directly to the electronic instrumentation (processor, sensors, transmitter, etc.) while the pit cover 310 is opened for service.

Referring to FIG. 6, during its operation the processor 356 continuously receives and stores the pressure signal measurements from the pressure sensor 354. The signal processor 356 executes pressure detection routines stored in local non-volatile memory to processes the pressure signals. In particular, the current pressure signal is initially scaled to a predetermine range, and then the scaled signal is filtered by running an auto-regressive averaging filter of "n" samples. The scaling range and number of samples can be preselected by the user.

The processor 356 determines if a fueling operation is presently occurring by comparing the pressure signal at the vent pit assembly against predetermined pressure patterns obtained during previous fueling operations. In one embodiment, the previous pressure patterns are stored in tables or data structures in a local memory device and the current and post-filtered pressure signals are buffered in a volatile signal processor memory. In order to detect aircraft fueling, the proximity of the post-filtered pressure signal to each of the stored patterns is calculated as the Euclidean distance ("D") between a vector formed by the n-sample post-filtered pressure signal and the closest pattern, as shown by the mathematical expression below:

$$D = \mathrm{sqrt}(\mathrm{Sum}(x_k - p_k)^2) \quad [1]$$

where x=a first point; and p=a second point; and k=1 to n.

If the calculated distance D is equal or lower than a preselected threshold, the processor 356 recognizes the fueling operation and then changes the scan time of the pressure sensor 354 to a "low-consumption" mode of operation. During the low-consumption mode of operation the scan time of the pressure is preferably reduced in order to conserve energy. A field technician can select the maximum time that the scan remains in low-consumption mode. The processor 356 continues to take samples during the low-consumption mode of operation, and compares the samples against the previously known patterns stored in memory until the fueling operation ceases. When the fueling operation terminates, the pressure signal returns to the "stand-by" operating pressure mode, which is controlled by jockey pumps.

For example, in some airports the stand-by jet fuel pressure is approximately 150 psig. Upon the processor 356 detecting the return to stand-by pressure mode, the scan rate returns to its normal level. Thereafter, the signal processor 356 calculates the pressure rate slope starting from the first reading taken after the stand-by pressure is reached until a low pressure alarm is reached, i.e., when the jockey pumps are operating. If the slope reaches a pre-selected alarm condition, the pressure readings are stored in local memory. Otherwise, the pressure reading process continues, and the post-filtered signals are stored in a volatile buffer memory of the signal processor 356, and the scan rate continues at its normal level.

A person of ordinary skill in the art will appreciate that the field technician can select from various methods or techniques for processing the data, including averaging, moving average, exponential filters, and individually selectable weight filters of the type:

$$Y_i = \mathrm{Sum}(wk_{y_{i-k}}), \quad [2]$$

where k=1 to n; and "wk" are the weight factor of past "yi-k" samples.

Referring to FIG. 3, while the pressure sensor scan time is set at its normal rate, the pipe-to-soil potential is measured between the probe connections taken at the pipe flange 336 and the reference electrode 330. The readings are then compared against predetermined pipe-to-soil potential patterns of non-leak conditions (normal condition) which are stored in a local non-volatile memory of the processor 356. The pipe-to-soil potential patterns can be calculated in advance by the user and stored in the non-volatile memory of the processor 356 for purposes of comparisons by the processor 356. When a leak occurs between two consecutive potential measurement points, the pipe-to-soil potentials at each one of such points change proportionally. If the potential readings deviate from the pattern of non-leakage conditions, the signal processor 356 writes a flag-bit into a local memory register by indicating with a "true" logical value that a "potential leak occurred". The signal processor 356 records the distance between the current potential against the closest pattern. The distance is calculated as a Euclidean distance between the vector formed by "n" consecutive potential readings and the pattern vector of "n" components, as indicated above using equation [1].

Referring again to FIG. 3, the signal processor 356 is communicably connected to a wireless communications device 362 such as a wireless transmitter, which is installed in the enclosure 344 attached to the underside of the pit cover 310. The transmitter 362 transmits signals to the centralized control station 206 via a wireless antenna 366 which is installed in a cavity 368 formed in the pit cover 310 above the enclosure 344. A pass-thru bore 364 is provided between the cavity 368 and the top of the enclosure 344 to accommodate a wire conductor that carries the signals from the transmitter 362 to the antenna 366 for transmission. An antenna cover 370 is mounted over the cavity 368 and antenna 366 to protect and seal the antenna therein. The antenna cover 370 provides protection for the antenna and can be fabricated from a non-metallic/ferrous material, such as an aluminum alloy Aluminum 6061-T6 fabricated by ALCOA, Inc of Pittsburgh, Pa., among other non-ferrous alloys, although such materials are not considered limiting. The antenna cover 370 can also be fabricated from materials that enhance power efficiency of the wireless communications between the centralized receiver and the data transmitter.

In one embodiment, the wireless communications device 362 is a transmitter that is manually programmed with the transmitter address by a user. Alternatively, the wireless communication device 362 is a transceiver which receives a predetermined transmitter address from the centralized control station 206. In either embodiment, wireless communication device 362 sends the post-processed data of the fuel pressure readings that reach the slope alarm along with the register and the pipe-to-soil potential readings to the central transceiver 222 at the centralized control station 206 for further processing by the central processor 220 (FIG. 2).

In one embodiment, the data from each vent pit containing post-processed valve pressure and pipe-to-soil potential measurements is transmitted to the centralized control station 206. The processor 220 at the centralized control station 206 continuously reads the received data and automatically determines the appropriate low pressure alarm set points for the fuel pumps, as opposed to having to manually set the alarms.

Figure 7:
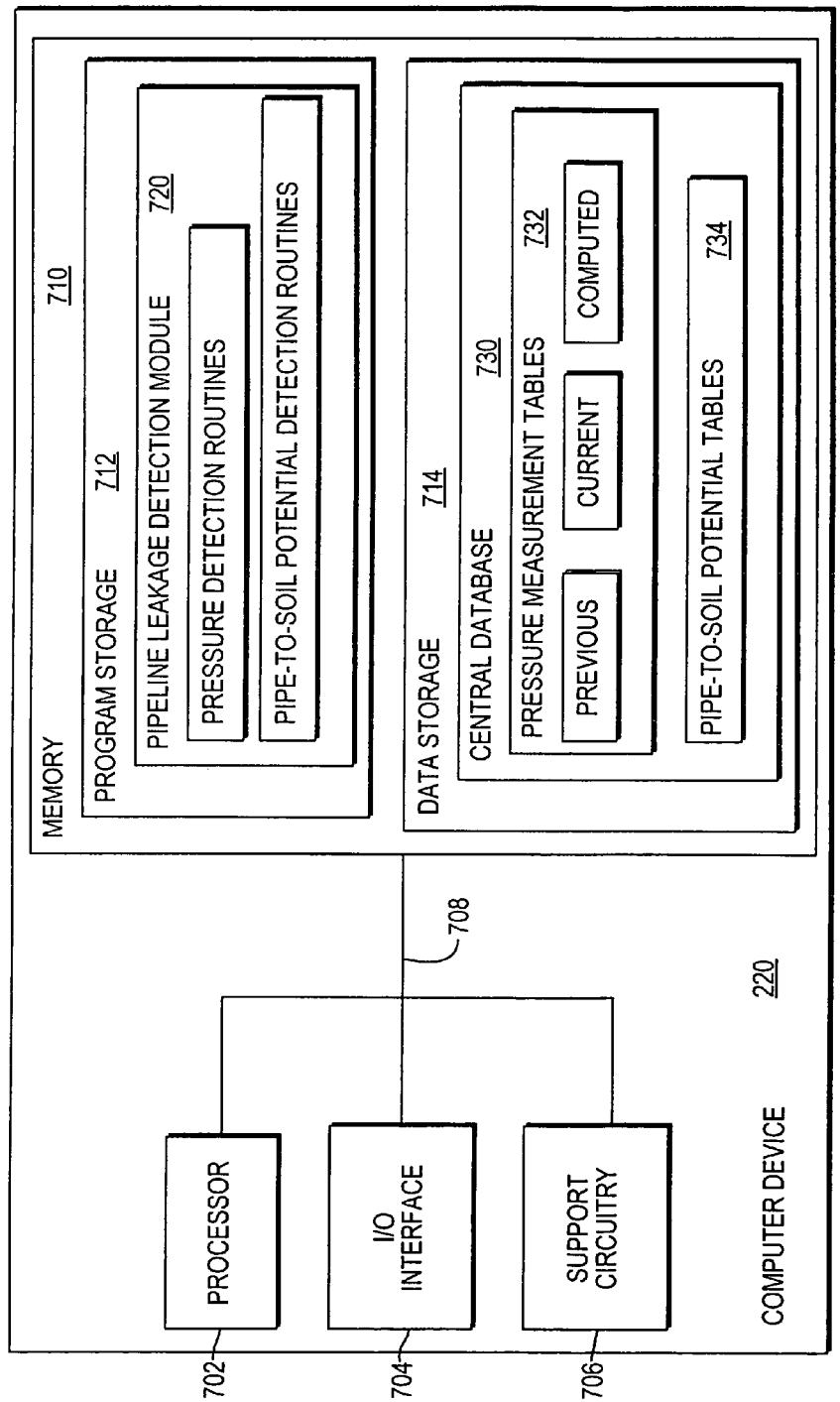
FIG. 7 is a block diagram of a computer device suitable for monitoring and detecting fuel leaks in the jet-fuel pipe leakage detection system of FIG. 2.

Referring now to FIG. 7, a block diagram of a computer device 220 suitable for monitoring and detecting fuel leaks in the jet-fuel pipe leakage detection system of FIG. 2 is illustratively shown. The computer device 220 is illustratively shown as part of the control station 206, although such location should not be considered limiting.

The computer device 220 can be one or more remote servers that centrally monitor and manage the jet fuel pressure and pipeline cathodic information and execute programs to detect fuel leakage at one or more vent pit and/or valve pit assemblies. The computer device 220 includes a multi-tasking, real-time software technology that can concurrently handle hundreds of thousands of queries and updates.

The computer device 220 can be a personal computer, minicomputer, workstation or mainframe, or a combination thereof. While the computer device 220 is shown for illustration purposes as a single computer unit, the system can comprise a group/farm of servers which can be scaled depending on the processing load and database size.

Specifically, the computer device 220 comprises at least one processor (e.g., central processor) 702, as well as memory 710 for storing various control programs, such as a pipeline leakage detection module 720. The processor 702 may be any conventional processor, such as one or more INTEL® Processors. The memory 710 can comprise volatile memory (e.g., DRAM), non-volatile memory (e.g., disk drives) and/or a combination thereof. The processor 702 cooperates with support circuitry 706, such as power supplies, clock circuits, cache memory, among other conventional support circuitry, to assist in executing software routines (e.g., pipeline leakage detection and pipe-to-soil potential programs) stored in the memory 710. The one or more central processors 702, memory 710 and support circuitry 706 are all commonly connected to each other through one or more bus and/or communication mediums (e.g., cabling) 708.

The computer device 220 also comprises input/output (I/O) circuitry 704 that forms an interface between various functional elements communicating with the computer device 220. For example, the computer device 220 is connected to a wireless communication network through an I/O interface 704, which receives information from and sends information over the wireless communication network to various transceivers 362 installed in vent pit assemblies 216 and valve pit assemblies 214 along the fuel pipeline system 108.

The memory 710 includes program storage 712 and data storage 714. The program storage 712 stores the pipeline leakage detection module 720 of the present invention, an operating system such as a WINDOWS® operating system, among other application programs and data retrieval modules (not shown). The pipeline leakage detection module 720 performs well-known pipeline leakage detection routines such as EIS (Electrochemical Impedance Spectroscopy), which characterize corrosion by direct electrical contact with the corrosion site, or MEIS (Magnetic Electrochemical Impedance Spectroscopy), which performs remote measurements using a magnetometer to detect current flow in the test object, e.g., section of pipe under test. MEIS characterizes the coating by multi-frequency analysis of the complex electrical impedance between the pipe and soil. The results of EIS or MEIS can optionally be plotted on a Nyquist plot to characterize disbonds, holidays and/or micro-cracks in the pipe coating. Other well-known pipeline leakage detection routines and pressure detection routines are contemplated as well.

The data storage 714 can be an internal or separate storage device, such as one or more disk drive arrays that can be accessed via the I/O interface 704 to read/write data. The data storage 714 can include a central account database 730 which includes pressure measurement tables 732, as well as pipe-to-soil potential tables 734. The pressure measurement tables 732 can include previous pressure measurements that were taken over various time periods, as well as present measurements taken at the local pit site. Further, the pressure measurement tables 732 can include average pressure values that are computed by the pipeline leakage detection module 720. Similarly, previous, present and average pipe-to-soil potential values can be stored in the pipe-to-soil potential tables 734 in accordance with the present invention, among other information. As used herein, the "present" as applied to potential measurements means the most recent of the contemporaneous measurement signals that are transmitted from the reference electrode and/or the local section of the pipeline.

The data storage 714 can be provided internally (as shown in FIG. 7) or externally from the computer device 220. Any of the software program modules in the program storage 712 and data from the data storage 714 can be transferred to specific memory locations (e.g., RAM) as needed for execution by the processor 702.

As such, it is contemplated that some of the process steps discussed herein as software processes may be implemented within hardware, for example, as circuitry that cooperates with the processor 702 to perform various steps. It is noted that the operating system (not shown) and optionally various application programs (not shown) are stored in the memory 710 to run specific tasks and enable user interaction.

The pressure and ICCP pipe-to-soil potential measurement devices at each of the service pits measure the fuel pipeline pressure losses and local pipe-to-soil potential losses. However, the analysis of both fuel pipeline pressure losses and potential losses, as a whole, can yield a more complete and accurate understanding of the severity and location of underground leaks occurring in the jet fuel piping system during fueling and non-fueling operations. In a preferred embodiment, the sensing devices are communicably coupled to the central control station 206. The central control station 206 includes a central transceiver and central processor (e.g., the computer device) 220 that receives the fuel pressure measurements, cathodic pipeline potential measurements, and pipe-to-soil potential measurements from the plurality of transceivers 362 installed at the individual fuel service pit assemblies 214 and 216 illustratively distributed around the airport fueling and taxi areas.

The central processor 220 contemporaneously monitors the status and the data that is preprocessed by the local processors 352 and transmitted by the transmitters 362 installed at the fuel service pits 214, 216. Additionally, since the control station 206 can monitor a combination of sensing devices contemporaneously, the central control station 206 is capable of determining the severity of an underground leak at a particular location, as well as determining appropriate warnings, corrective steps, and other actions required to minimize any further harmful effects and/or loss of operations.

For example, the central control station 206 can send control signals to various fuel control components in the system, such as the fuel pumps and valves, in order to partially or completely shut down the fuel supply system. In this manner, the central control station 206 has the capability to control fuel delivery to a particular pipeline branch 108 of the underground jet fuel pipeline system. The corresponding valves and/or pumps can be controlled from the centralized location, as opposed to manually opening/closing the fuel supply valves or pumps at various locations. Further, depending on the severity of a leak and safety issues, low levels of fuel may be permitted to flow under some leakage conditions to allow some fueling operations to continue without interruption. Alternatively, there can be instances where higher levels of fuel flow is permitted, but with leakage alarm conditions available so that one or more fuel valve supplies or pumps can be closed ahead of time before a major leak develops. Accordingly, the determination and closing of one or more fuel supply valves/pumps is performed automatically by the central processor 220, as opposed to the previous techniques of relying on manual tests and visual inspections that at times, can be open to subjective interpretation, thereby possibly causing the field technicians to make incorrect decisions regarding the determination, location and control management of underground leaks.

The central control station 206 can generate automatic alarms and/or notifications to log and indicate jet fuel piping pressures and ICCP pipe-to-soil potentials, as well as send control messages over the wireless network to the local fuel service pit assemblies to configure and correct, if necessary, operation of the sensors and instrumentation. Further, the notification levels for alarms and for closure of fuel valves and start/stop of the fuel pumps can be preset by maintenance and operations personnel at the control station 206. The sensor control messages can be sent to the pit assemblies individually or contemporaneously and on a continuous or periodic basis, as opposed to relying on field technicians or other service personnel to manually report or log the conditions of the sensing devices on an individual basis.

The notifications, reports and/or alarms can be reported locally on-site by the fuel dispenser trucks 210 or remotely at the control station 206. The control system 206 monitors the fuel-related events occurring in the pipeline system, as well as maintains historical logs or records of current and past leakages and other maintenance events for identifying trends in component and other instrumentation failure trends, workmanship issues and other quality and reliability related issues that can be detrimental to safety and fueling operations.

In one embodiment, the transceiver 362 is connected to a driver (not shown) that operates an electrical valve actuator (also not shown) which can open or close the vent pit valve 322. The receiver can be integral with the transmitter hardware or a separate receiver unit. The processor 356 stores the data received through the transceiver 362 in non-volatile memory for further processing.

In one embodiment, the open/close operations of the vent valve 322 can be controlled remotely by operators at the control station 206 for various reasons such as troubleshooting and maintenance procedures. Illustratively, the vent valve 222 in a particular vent pit can be closed with an electronically controlled electric, pneumatic or hydraulic actuator (not shown) to isolate its pressure sensor 354 from the rest of the system if, for example, a malfunction of a pressure sensor is occurring which requires one or more pressure sensors to be set off-line to avoid misleading measurements, while keeping the pressure sensors in other vent pits operational. Alternatively, commands can be sent by the control station 206 for safety purposes to similarly close the sensor root valve 320 when aircraft re-fuelling is occurring at a nearby location, or due to other operational reasons, and then re-open the root valve 320 again remotely when required.

The processor 356 stores the data received through the transceiver 362 in non-volatile memory for further processing. The non-volatile memory incorporated in the signal processor 356 can be used for storing configuration data for the sensors, such as upper range limits and lower range limits of the sensors.

Furthermore, the data stored in the non-volatile processor memory can be used to schedule the opening and closing of the sensor root valve 320, which is used to perform automatic pre-programmed pressure measurements of the underground jet fuel line pressure during low and high aircraft re-fuelling frequency. The scheduling of the opening/closing of the root valve 320 permits the operator to remotely isolate specific pressure sensors in order to identify jet fuel line areas of different dynamic pressure patterns which can be present during refueling in specific areas of the underground jet fuel piping, as well as to subsequently perform verifications of the correctness and accuracy of the different pressure signals measured at different points under different configurations of pressure sensors in their active and inactive states. This analysis allows the operators at the control station 206 to identify reflections of pressure waves in the pipeline that are generated by fueling operations, and to detect pressure patterns specific to refueling in specific areas of the jet fuel line.

Although a wireless communication network is preferred and has been used to describe the present embodiments, a person of ordinary skill in the art will appreciate that a wired communication network can be used as the primary or as a secondary or backup network. For example, cabling for a wired network can be laid and installed during initial construction of the apron.

Accordingly, the present invention includes an underground pipeline leakage detection system that monitors and determines the presence and location of any fuel leakage occurring in underground liquid piping systems, such as jet fuel piping systems. The system and methods of the present invention automatically detect any fluid leakage at an early stage so that corrective action can be implemented prior to the leak escalating to unacceptable hazardous levels. Further, the present invention eliminates the need to rely on the subjective decision making based on after-the-fact inspection and detection analyses through trial-and-error methods that can include having to start and stop the jet fuel pumps while taking pressure measurements at different locations and times.

While the foregoing is directed to embodiments of the present invention, other and further embodiments of the invention can be devised by those of ordinary skill in the art based on this description without departing from the basic scope thereof, and the scope thereof is determined by the claims that follow.

I claim:

1. Apparatus for detecting fuel leaks in an area having at least one fuel service pit assembly for managing fuel flow from an underground fuel pipeline, the at least one fuel service pit assembly including at least one sidewall having an inlet for receiving a connecting pipeline in fluid communication with the underground fuel pipeline, and a pit cover for accessing the at least one service pit assembly, the leak detection apparatus comprising:

a potential reference electrode respectively buried in direct contact with ground soil proximate each of the at least one fuel service pit assemblies;

a test point defined at a local section of the pipeline;

said at least one fuel service pit assembly further comprising:

a local signal processor coupled to memory for communicating and storing present and previous pipe-to-soil potential measurements during fueling and non-fueling operations, said signal processor configured to receive a first electrical signal indicative of an electrical potential from the potential reference electrode and a second electrical signal indicative of an electrical potential at the local section of the pipeline, wherein a pipe-to-soil potential is defined by a voltage potential difference as between the test point and the potential reference electrode, said signal processor operable to preprocess the pipe-to-soil measurements by receiving sample pipeline and soil electrical potential measurements at predetermined intervals, calculating an average pipe-to-soil potential value based on the sample pipeline and soil potential measurement values, and comparing the latest sample pipe-to-soil potential measurement with the average pipe-to-soil potential value;

a local transceiver communicably coupled to the local signal processor for receiving the preprocessed pipe-to-soil measurements from the signal processor; and a central control station having a central transceiver for receiving said preprocessed pipe-to-soil measurements from the local transceiver over a communications network, and a central processor for further processing said preprocessed pipe-to-soil measurements received from the at least one fuel service pit assembly to detect and locate the position of a fuel leak in the underground fuel pipeline.

2. The apparatus of claim 1, wherein the pit cover comprises a watertight and heat-resistant housing mounted to its underside and configured to enclose the local signal processor and the local transceiver.

3. The apparatus of claim 2, wherein the at least one fuel service pit further comprises:

a pressure sensor mounted within said housing;

a vent valve coupled to the underground pipeline via the connecting pipeline; and a capillary tube coupled between said pressure sensor and the underground pipeline, wherein the capillary tube is flexible and extends a length sufficient to permit personnel access to the service pit assembly through the pit cover.

4. The apparatus of claim 3, wherein the vent valve is coupled to the underground pipeline by a vent pipe connection having a distal end mounted to the pipeline, a maintenance valve mounted to the opposing proximal end of the vent pipe connection, and a T-fitting mounted between the maintenance valve and the vent valve, and wherein the capillary tube has a first end mounted to the T-fitting and the opposing second end communicably coupled to the pressure sensor.

5. The apparatus of claim 3, wherein the local signal processor receives pressure measurements from the pressure sensor at predetermined intervals and performs pattern recognition routines to determine the occurrence of fueling operations and non-fueling operation.

6. The apparatus of claim 3, wherein the local signal processor is operable to compare current pressure measurements with previous pressure patterns obtained during fueling operations.

7. The apparatus of claim 1, wherein the first and second electrical potential signals are provided through first and second electrical conductors which are enclosed in a flexible conduit having a length sufficient to permit the opening and closing of the pit cover.

8. The apparatus of claim 1, wherein the at least one fuel service pit assembly is one of a vent pit assembly or a valve pit assembly.

9. The apparatus of claim 1, further comprising a switch having an actuator coupled to the pit cover that permits power flow to the local signal processor and local transmitter when the pit cover is closed, and disables power flow to the local signal processor and local transmitter when the pit cover is opened.

10. The apparatus of claim 1, wherein said at least one fuel service pit assembly comprises a plurality of service pit assemblies, and wherein the central control station further comprises:

a memory coupled to the central processor; and a pipeline leakage detection program stored in the memory and executable by the central processor, the pipeline leakage detection program operable to:

receive preprocessed pipe-to-soil potential measurements from adjacent service pit assemblies transmitted over the communications network from each of the plurality of service pit assemblies at predetermined intervals;

determine whether the pipe-to-soil measurements at adjacent service pit assemblies have changed proportionally; and if it is determined that the pipe-to-soil potential measurements deviate from patterns associated with non-leakage conditions, the pipeline leakage detection program is further operable to:

provide an alert condition to operating personal indicative of a pipeline leak;

determine the location of the pipeline leak based on a distance between the present pipe-to-soil potential and the previous pipe-to-soil potential patterns at each service pit assembly location; and determine appropriate low pressure alarm set points for fuel pumps that control fuel flow through the underground pipeline.

11. The apparatus of claim 10, wherein the location of the leak is determined by comparing present pipe-to-soil potential and the previous pipe-to-soil potential patterns at each service pit assembly location.

12. The apparatus of claim 1, further comprising a wireless antenna mounted within a cavity formed in the pit cover, wherein said wireless antenna is communicably coupled to the local transceiver for receiving and transmitting information wirelessly over the wireless network.

13. The apparatus of claim 1, wherein the pit cover includes a power supply assembly comprising at least one solar cell mounted in a compartment formed within the outer surface of the pit cover, a battery charger electrically coupled to receive electrical current from the at least one solar cell, a rechargeable battery electrically coupled to the battery charger, and a switching control circuit for controlling power to the local signal processor and the transceiver.

14. The apparatus of claim 1, wherein the pit cover further comprises a wireless antenna mounted under a protective high-compression resistant non-metallic cover formed on the top surface of the pit cover, said antenna being electrically coupled to the transceiver via a cable.

15. The apparatus of claim 1, wherein the local signal processor is operable to perform signal conditioning and noise filtering in order to reduce the level of noise produced by fueling operation and fuel surges.

16. The apparatus of claim 1, wherein the local signal processor is operable to detect negative pressure peaks caused by leaks and impressed current cathodic protection pipe-to-soil potential loss determination.

17. The apparatus of claim 1, wherein the central processor is operable to:

receive, from each local signal processor installed at each fuel service pit, the pre-processed signals associated with local pressure measurements; and perform pattern recognition to detect pressure losses in the pipeline.

18. The apparatus of claim 1, wherein the central processor is operable to:

receive, from each local signal processor installed at each of the at least one fuel service pit assembly, the preprocessed pipe-to-soil measurements; and calculate differences of electrical potential loss measured at adjacent fuel service pits.

19. The apparatus of claim 1, wherein the central processor is operable to:

monitor pressure loss rate at each local service pit assembly; and adjust pressure level alarms based on aircraft fueling operations.

20. The apparatus of claim 1, wherein the central processor is operable to:
- determine drops in electrochemical potential along the underground fuel pipeline from adjacent service pits;
- compare the drops in electrochemical potential to historical electrochemical potentials at each service pit; and
- identify a leakage condition between adjacent service pits when the comparative drops in electrical potential exceed a predetermined value.

21. The apparatus of claim 1, wherein the at least one fuel service pit assembly further comprises a cover switch having an actuator that interrupts power flow to the local signal processor and local transceiver when the pit cover is in an open condition.

22. The apparatus of claim 1, wherein the communications network comprises a wireless communications network.

23. A method for detecting fuel leaks in an area having at least one fuel service pit assembly for managing fuel flow from an underground fuel pipeline, the at least one fuel service pit assembly including at least one sidewall having an inlet for receiving a connecting pipeline in fluid communication with the underground fuel pipeline, a pit cover for accessing the at least one service pit assembly, the pit cover including a local signal processor coupled to memory for communicating and storing present and previous pipe-to-soil potential measurements during fueling and non-fueling operations, the local signal processor being communicably coupled to a local transceiver for communicating pressure and electrical potential measurements to a central control station over a communications network, a test point defined at a local section of the pipeline, and a potential reference electrode respectively buried in direct contact with ground soil proximate each of the at least one fuel service pit assemblies, the leak detection method comprising:
- receiving, at the local signal processor, a first electrical signal indicative of an electrical potential from the potential reference electrode and a second electrical signal indicative of an electrical potential at the local section of the pipeline, wherein a pipe-to-soil potential is defined by a voltage potential difference as between the test point and the potential reference electrode;
- preprocessing pipe-to-soil measurements by receiving sample pipeline and soil electrical potential measurements at predetermined intervals, calculating an average pipe-to-soil potential value based on the sample pipeline and soil potential measurement values, and comparing the latest sample pipe-to-soil potential measurement with the average pipe-to-soil potential value;
- communicating the preprocessed pipe-to-soil measurements from the signal processor to the local transceiver;
- transmitting the preprocessed pipe-to-soil measurements to the central control station over the communications network; and
- processing, at the central control station, said preprocessed pipe-to-soil measurements received from the at least one fuel service pit assembly to detect and locate the position of a fuel leak in the underground fuel pipeline.

* * * * *